(12) United States Patent
Liu et al.

(10) Patent No.: US 10,803,115 B2
(45) Date of Patent: Oct. 13, 2020

(54) IMAGE-BASED DOMAIN NAME SYSTEM

(71) Applicant: International Business Machines Corporation, Armonk, NY (US)

(72) Inventors: Chih-Hsiung Liu, Taipei (TW); Cheng-Fang Lin, New Taipei (TW); I-Chien Lin, Taipei (TW); Chiwen Chang, Taipei (TW); Ci-Wei Lan, Keelung (TW); Tsai-Hsuan Hsieh, Taoyuan (TW); Kate Lin, Tainan (TW); Peter Wu, New Taipei (TW); Kuo-Liang Chou, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 16/048,596

(22) Filed: Jul. 30, 2018

(65) Prior Publication Data
US 2020/0034439 A1 Jan. 30, 2020

(51) Int. Cl.
*G06F 7/00* (2006.01)
*G06F 16/51* (2019.01)
*G06N 20/00* (2019.01)
*G06F 16/951* (2019.01)
*G06F 16/58* (2019.01)
*G06F 16/955* (2019.01)

(52) U.S. Cl.
CPC .......... *G06F 16/51* (2019.01); *G06F 16/5866* (2019.01); *G06F 16/951* (2019.01); *G06F 16/9566* (2019.01); *G06N 20/00* (2019.01)

(58) Field of Classification Search
CPC .. G06F 16/51; G06F 16/9566; G06F 16/5866; G06F 16/951; G06N 20/00
USPC .................................................. 707/600–899
See application file for complete search history.

(56) References Cited

U.S. PATENT DOCUMENTS

| 8,965,971 | B2 | 2/2015 | Goyal et al. |
| 9,070,046 | B2 | 6/2015 | Geng et al. |
| 2004/0205512 | A1 | 10/2004 | Hoover et al. |
| 2010/0299332 | A1* | 11/2010 | Dassas ............... G06K 9/00456 707/741 |
| 2017/0212910 | A1 | 7/2017 | Morris et al. |

FOREIGN PATENT DOCUMENTS

CN 104539714 11/2017

OTHER PUBLICATIONS

Soferman, "How to dynamically create SEO friendly URLS for your site's images," Cloudinary Blog, Mar. 2015, 14 pages.

(Continued)

*Primary Examiner* — Isaac M Woo
(74) *Attorney, Agent, or Firm* — Van Leeuwen & Van Leeuwen; Alexander G. Jochym

(57) ABSTRACT

An approach is provided to provide URLs based on a digital subject matter image (DSMI) received from a requestor. The approach identifies a set of classification labels pertaining to the DSMI and matches the set of classification labels against multiple sets of predefined labels with each of the sets of predefined labels corresponding to a URL. The matching results in a selected URL pertaining to the DSMI with this URL being returned to the requestor. In one embodiment, the approach is performed by a domain name system (DNS).

20 Claims, 7 Drawing Sheets

(56) References Cited

OTHER PUBLICATIONS

Lin et al., "Deep learning of binary hash codes for fast image retrieval," 2015 IEEE Conference on Computer Vision and Pattern Recognition Workshops (CVPRW), Boston, MA, Jun. 2015, 9 pages.

Mcgee, "Up Close With Google's Search by Image: Hits, Misses & More," Search Engine Land, Jun. 2011, 13 pages.

\* cited by examiner

IMAGE-BASED DOMAIN NAME SYSTEM

BACKGROUND

Everyday objects encountered by individuals are often difficult to describe in a manner that allows further investigation, such as when a user returns home or to their office. A particular image, such as a person's face, might look familiar but often cannot be described in a way that matches the image to a network resource, such as a website. Traditional approaches of matching images to network resources associate a barcode, such as a matrix barcode, to certain images. A challenge of the traditional approaches, however, is that such approaches are not intuitive to users and not every image is associated with a matrix barcode. Thus, oftentimes a user is searching for information about an image that has no associated matrix barcode.

BRIEF SUMMARY

An approach is provided to provide URLs based on a digital subject matter image (DSMI) received from a requestor. The approach identifies a set of classification labels pertaining to the DSMI and matches the set of classification labels against multiple sets of predefined labels with each of the sets of predefined labels corresponding to a URL. The matching results in a selected URL pertaining to the DSMI with this URL being returned to the requestor.

In one embodiment, the approach is performed by a domain name system (DNS) that performs a lookup on the DSMI to identify a URL that pertains to the DSMI. The DNS utilizes a domain name server to query root servers and name servers to resolve classification labels identified from the DSMI with predefined classification labels that correspond to various URLs.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present invention may be better understood, and its numerous objects, features, and advantages made apparent to those skilled in the art by referencing the accompanying drawings, wherein.

DETAILED DESCRIPTION

Overview of the Invention

Figure 1:
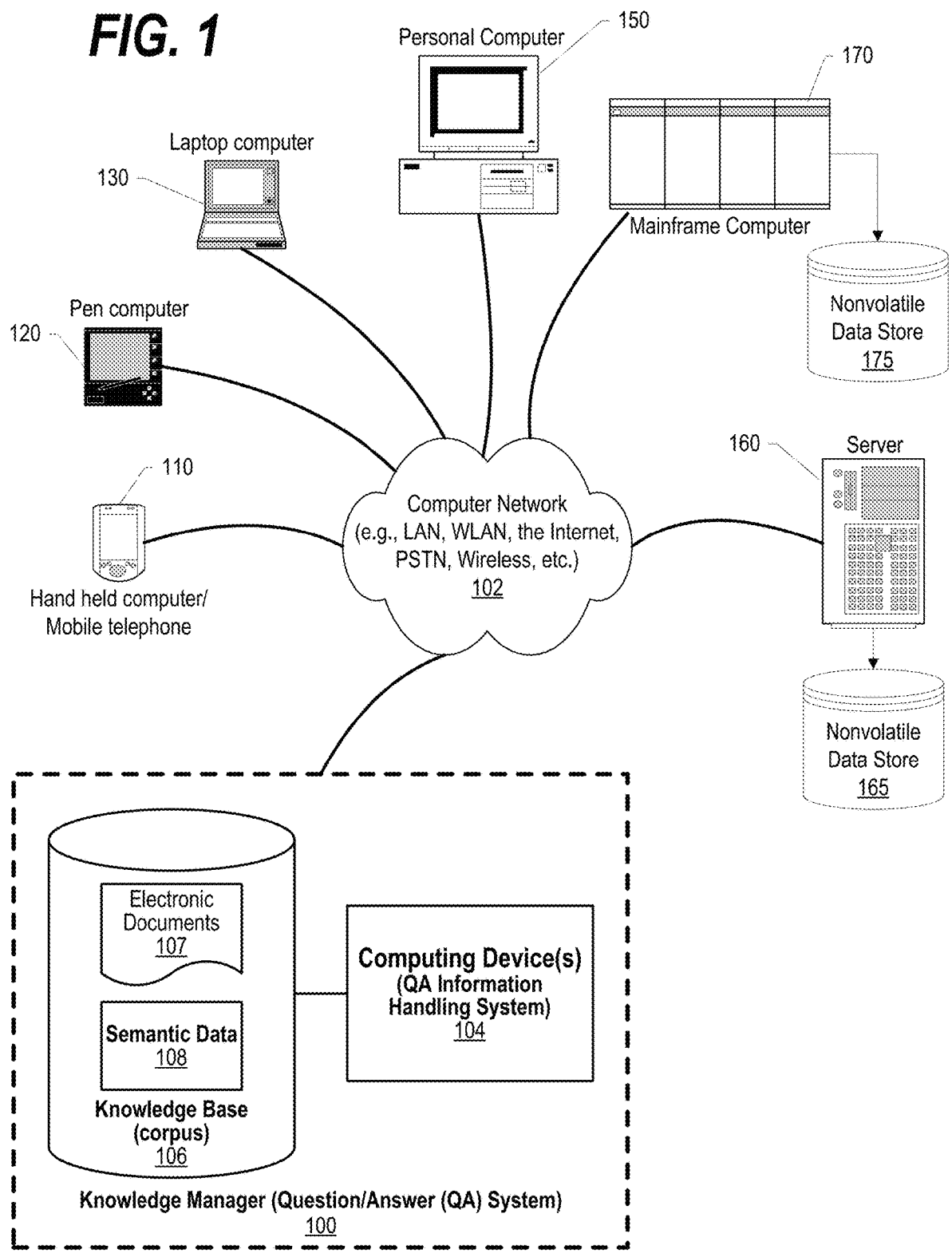
FIG. 1 depicts a schematic diagram of one illustrative embodiment of a question/answer creation (QA) system in a computer network.

FIGS. 1-7 depict an approach that provides a network resource (Uniform Resource Locator, or "URL") based on a given digital subject matter image (DSMI). As the name implies, a "digital subject matter image" is a digital image of the actual subject, such as a person's face, a building, etc. rather than a digital image of a code, such as a matrix barcode, that corresponds to a given subject. A DSMI is input to the system that uses multiple image classifiers to extract features of the image from different perspectives. Using a person's face, for example, the features would be the various facial features that uniquely identify the individual that is the subject of the digital image. Some features might depend on when the image was taken, for example the person might be smiling or frowning in the image depending on when the image was captured.

During analysis of a DSMI, the system identifies a high level classification of the image. The classification labels associated with the high level classification are used to identify the main category of the image. In a Domain Name System (DNS) context, the main category might be obtained from a root server. Examples of main categories might be facial images, structures, signs, animal images, and the like. Once a main category of an image is identified, classifiers are used to identify the particular features of the image that result in classification labels. In one embodiment, resulting classification labels are sorted (ordered) to create a deterministic sequence of classification labels. In a DNS context, the identified classification labels are used to generate parts of the URL. In one embodiment, the domain name system utilizes a number of name servers to query the name servers with query strings formed using the classification labels. The name servers match the classification labels in the query strings with predefined classification labels to identify all, or part, of the URL. For example, in a four-part URL (i.e., "nnn.nnn.nnn.nnn") various classification label lookups can be used to identify the various parts of the URL.

Using a facial recognition example, a digital image of a person's face can be captured either as part of a registration process or automatically by using machine learning in a system that "crawls" network locations to find and analyze facial images found on the Internet. High level descriptions and associated classification labels are identified based on the facial image. For example, the high level image might be the person's name corresponding to the image. Associated labels might include whether the individual is smiling, frowning, serious, etc. An expected threshold is provided, either automatically or based upon the person's image being captured. Finally, a URL is mapped to the classification labels identified for the image and the URL, classification labels, and threshold data are stored in a data store that registers the image with the URL with the identified classification labels used in registration being used as predefined classification labels when subsequently responding to a user's request. These predefined classification labels are used to compare to classification labels identified for a given DSMI submitted by a requestor to ascertain a network resource that corresponds to such image.

In one embodiment, the example system described herein may use a convolutional neural networks (CNN) to identify classification labels in DSMIs. Moreover, the techniques and methods described herein can be applied to any deep learning model, including those based on convolutional neural networks, because the matching is performed on the classification labels identified in the digital images, not on the images themselves. For example, the techniques and methods may be employed with the AlexNet, VGG, Inception, ResNet, DenseNet deep learning models.

Inventive Advantages

The inventors have discovered that a system that identifies a network resource (a URL) from an image according to the teachings provided herein advantageously provides better performance (better accuracy) than traditional systems and also alleviates need for secondary images, such as matrix barcodes, and therefore reduces computing resources used to generate and display such secondary images used in conventional approaches. For example, having a matrix barcode computed, registered, and printed proximate to a subject of interest, such as an advertisement, results in wasted computational resources when such matrix barcodes are not needed using the approach provided herein.

While the inventive principles have been described herein with relation to particular types of images, such as facial images and the like, it will be appreciated that the techniques and methods described herein can be applied to seemingly endless types of images with each of these image types being capable of being identified by various classification labels that can be used to identify a particular network resource that pertains to such other images. In addition, the analysis of images and identification of network resources have been described in relation to particular systems, such as Domain Naming Systems (DNS), however it should be appreciated that these techniques and inventive principles can be used in a wide variety of systems that might benefit from identifying network resources that pertain to given digital subject matter images (DSMIs).

Terminology and Scope

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

DETAILED DESCRIPTION OF THE INDIVIDUAL DRAWINGS

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

An example of QA system 100 may be the IBM Watson™ QA system available from International Business Machines Corporation of Armonk, N.Y., which is augmented with the mechanisms of the illustrative embodiments described hereafter. The QA knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
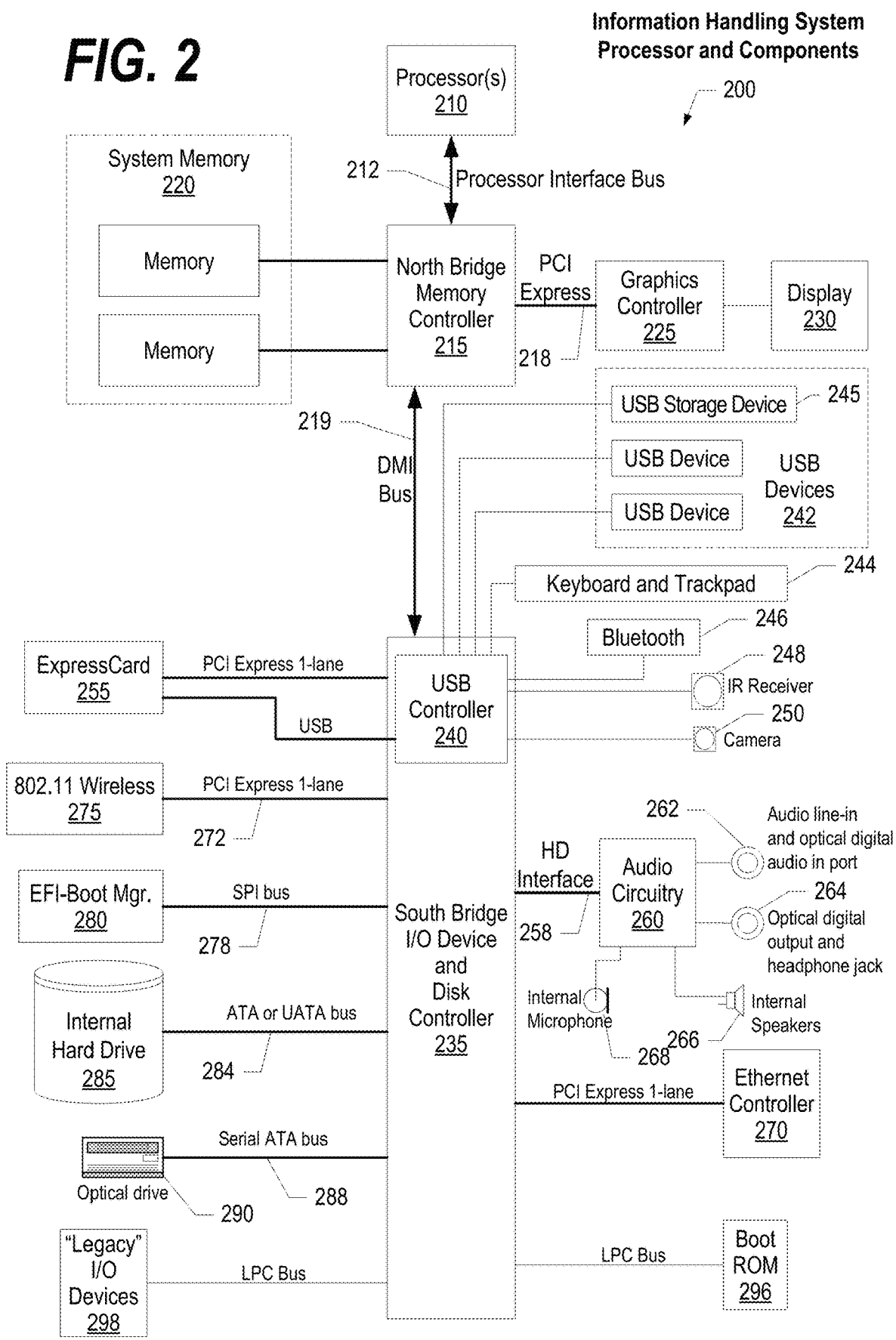
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
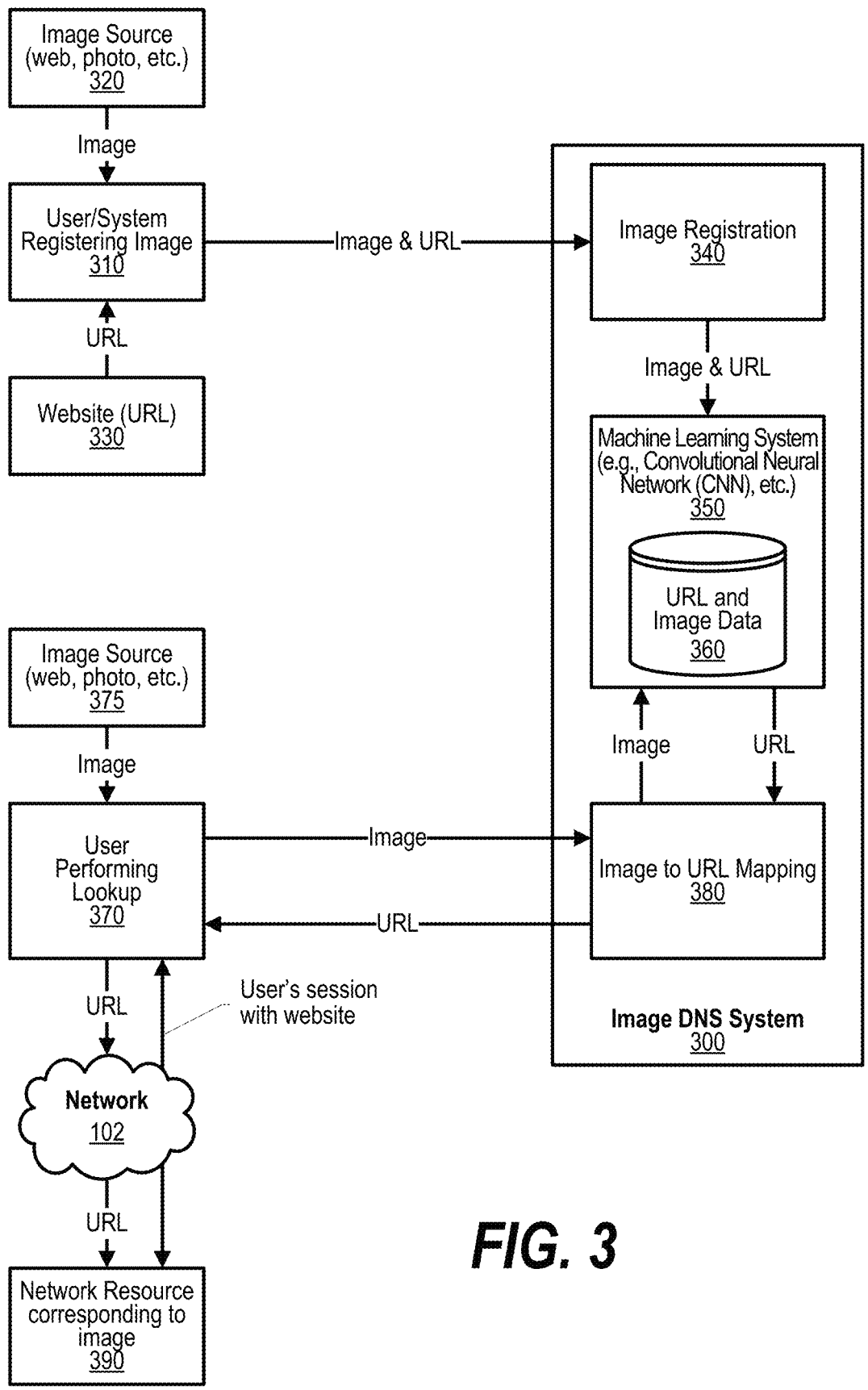
FIG. 3 is a system diagram depicting the components utilized in an image-based domain name system.

FIG. 3 is a system diagram depicting the components utilized in an image-based Domain Name System (DNS). Image DNS System 300 is shown with two high level functions. Image registration process 340 is performed by the Image DNS System to receive images and corresponding network resources (known as Uniform Resource Locators, or "URLs"). Entity 310 registers the images and the URLs. The entity can be a user, such as a person, that is inputting images and URLs to which such images pertain. In addition, entity 310 can be a system, such as a "web crawler" application that searches the Internet for images and corresponding URLs.

Image source 320 can be a digital image captured by a digital capturing device, such as a digital camera, or can be pre-existing digital images, such as those found on Web sites accessible through the Internet. Image source 320 is a digital subject matter image (DSMI), such as a digital image of a person, place, or thing, that is observable by someone. A DSMI is not a digital image of a code, such as a matrix barcode, that applies to an object through a secondary system.

Website (URL) 330 to which DSMI 320 pertains is also input to the image. For example, a DSMI of a company executive might be input with the URL pertaining to the executive being the URL of the company's website. Image registration process 340 ingests the digital image by analyzing the digital image into a number of classification labels that are input to machine learning system 350. The inputted network resource (URL) is stored in data store 360 and associated with the classification labels obtained from the inputted DSMI. These classification labels are used as predefined classification labels to compare to requests that are handled by Image to URL mapping process 380.

Image to URL mapping process 380 receives an image (DSMI) from user device 370 that has input DSMI 375 in order to ascertain a network resource (URL), such as a website address, that pertains to the image. User 370 inputs DSMI 375 to Image DNS system 300. The DNS system processes the image input by the user using process 380 that identifies classification labels that pertain to the image input by the user. These classification labels are matched against various sets of predefined classification labels previously input to DNS system through registration process 340.

If a match is found for the image input by user device 370, then the URL corresponding to the predefined classification labels that matched the DSMI input by the user is returned to user device 370, such as a user's computer system, smart phone, or other information handling system. In one embodiment, the URL received at the user's device is automatically requested from computer network 102, such as the Internet, with network resource 390, such as a company's website, being returned to the user, thus establishing a session between user's device 370 and network resource 390.

From the user's point of view when using device 370, the user captures a digital image (DSMI) of something or someone of interest, the image is automatically sent to Image DNS System 300 for address resolution, a network resource identifier (URL) is found that pertains to the image provided by the user and this URL is returned to the user with the device automatically requesting the URL from network 390 and the website or other network resource addressed by the URL appears on user's device 370. Using the example of an image of a person, suppose the user recognizes an individual but cannot recall the individual's name or occupation. The user can capture a digital image of the individual with the image used by Image DNS System to find a network resource (URL) pertaining to the individual. For example, if the individual's name is "John Doe" and he is the president of "Acme Corp." with another of the individual's digital images (DSMIs) previously used to register "John Doe" with the URL of "Acme Corp.", then, in response to the digital image, the user would receive a response of the "Acme Corp" website, perhaps at a page in the website describing the company's president John Doe.

Figure 4:
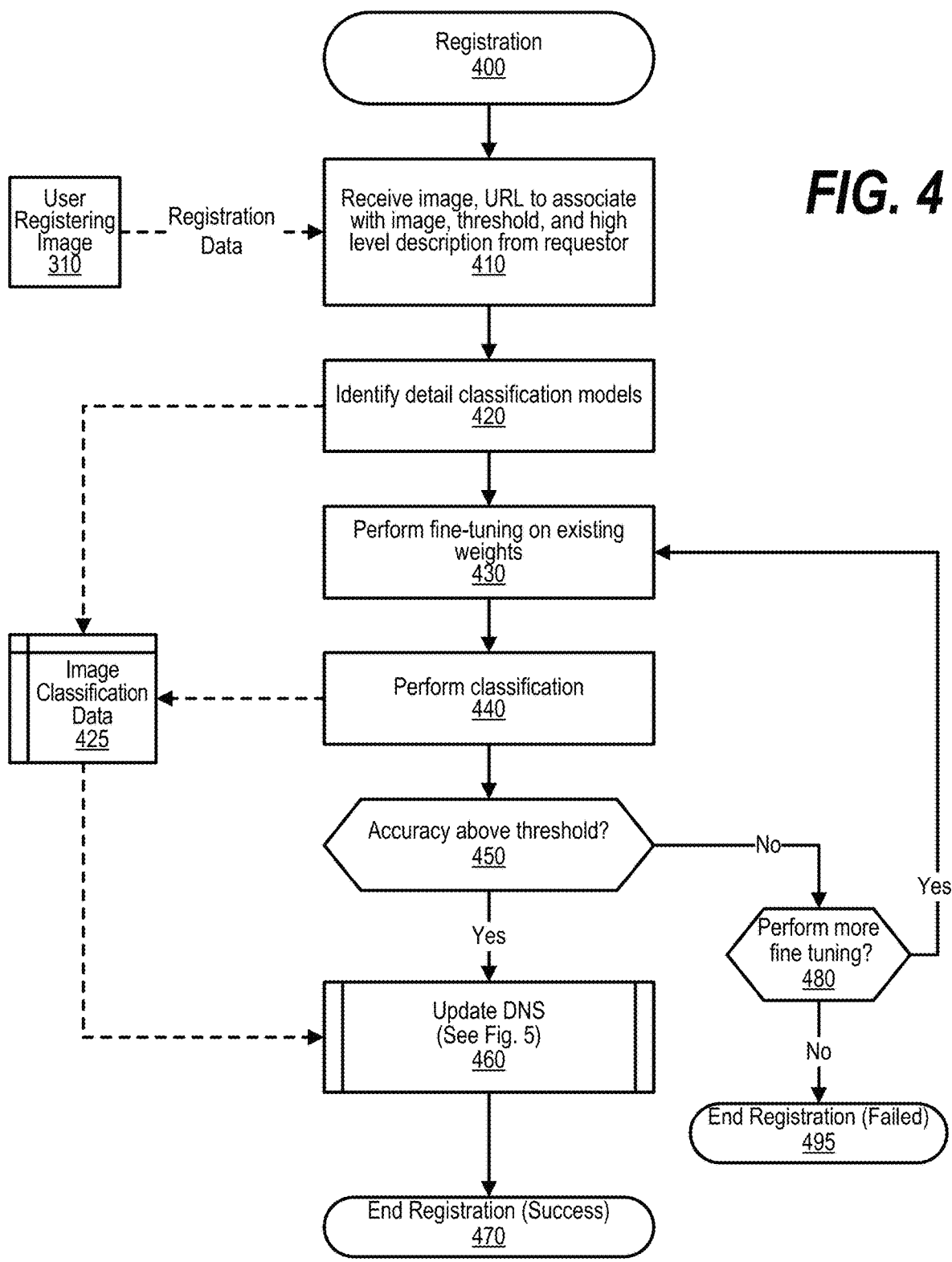
FIG. 4 is a flowchart showing steps performed to register images with network resources.

FIG. 4 is a flowchart showing steps performed to register images with network resources. FIG. 4 processing commences at 400 and shows the steps taken by a registration process that registers images with a domain name system. At step 410, the process receives a digital subject matter image (DSMI) and the URL that is to be associated with the image. In one embodiment, the requestor also provides a threshold value and a high level description from the requestor. The threshold is used to determine an accuracy, while the high level description might be the name of the subject in the digital image. At step 420, the process identifies detail classification models by analyzing the digital image. For example, if the image that was received is a facial image, then the detailed classification models would be those models used to identify classification labels from a facial image. Likewise, if the image was a building, then the detailed classification models would be those models used to identify classification labels from a structure. The high level classification of the image and the identified classification models are stored in memory area 425.

At step 430, the process performs fine-tuning on existing weights on the digital image. The fine tuning extracts detailed features from the digital image based on the identified classification models. For example, if a facial image model was identified, then a detail that might be extracted from the digital image would be the facial expression (e.g., "smiling," "frowning," etc.) shown in the image. Likewise, other detail feature extractions might be facial structure features used to uniquely identify an individual based on a facial image. At step 440, the process performs classification of the digital image based on the detailed features extracted from the digital image. The classification forms a classification label that is stored in memory area 425. The process determines as to whether the accuracy of the classified labels to successfully identify the subject of the image is above a threshold (decision 450). The threshold might be a default threshold or provided to the routine along with the registration data.

If the accuracy is above the threshold, indicating that further classification labels are not needed to identify the image, then decision 450 branches to the 'yes' branch exiting the loop. On the other hand, if the accuracy is not above the threshold, then decision 450 branches to the 'no' branch for further image analysis by looping back to step 430 to perform further fine tuning and gathering more classification labels pertaining to the digital image. During this looping, a determination is made (decision 480) as to whether more iterations should be taken to identify more classification labels. More fine tuning might not be helpful if, for example, the image is of poor quality. In this case, decision 480 branches to the 'no' branch and FIG. 4 processing thereafter unsuccessfully ends at 495 with processing being unable to classify the image to the specified threshold, perhaps due to flaws or problems with the digital image that was received at step 410.

On the other hand, if more fine tuning is deemed appropriate, then decision 480 branches to the 'yes' branch to loop back to step 430 to perform additional fine tuning of classification labels identified in the digital image. Once accuracy of the classification labels identified for the digital image are above a given threshold, then decision 450 branches to the 'yes' branch whereupon, at predefined process 460, the process performs the Update DNS routine (see FIG. 5 and corresponding text for processing details).

Predefined process 460 takes the classification labels stored in memory area 425 as the predefined classification labels and associates the set of predefined classification labels with the network resource (URL) provided by the registration requestor at step 410. FIG. 4 processing thereafter successfully ends at 470.

Figure 5:
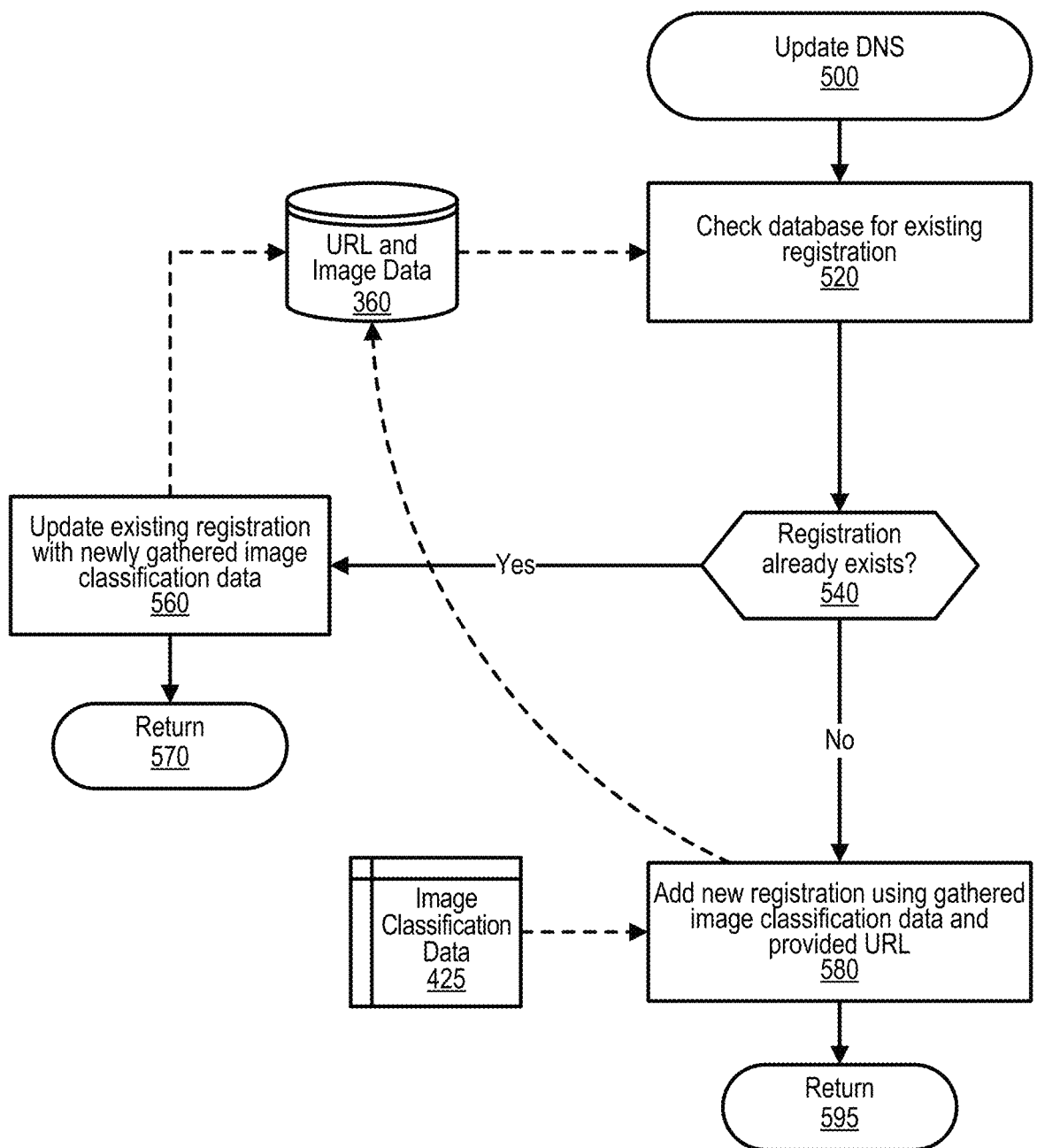
FIG. 5 is a flowchart showing steps performed to update a domain name system (DNS) with image-based registration information.

FIG. 5 is a flowchart showing steps performed to update a domain name system (DNS) with image-based registration information. This routine is called from the registration routine shown in FIG. 4. FIG. 5 processing commences at 500 and shows the steps taken by a process that updates the Domain Name System using image data (predefined labels identified in a digital image) and associates the image data with a network resource (URL). At step 520, the process checks database 360 for an existing image registration pertaining to this URL. The process determines as to whether an image registration already exists for this URL (decision 540). If a registration already exists, then decision 540 branches to the 'yes' branch to perform step 560. On the other hand, if no image registration currently exists for this URL, then decision 540 branches to the 'no' branch to perform step 580.

If a registration already exists then, at step 560, the process updates the existing registration with newly gathered image classification data. For example, if an registration already exists of a facial image of "John Doe" as president of "Acme Corp.", the newly gathered classification labels would be used as additional training data with additional classification labels that correspond to John Doe's facial features since the new image of John Doe is likely different than the previously identified classification labels of John Doe. Likewise, different types of images might be associated with the same URL. For example, a facial image of John Doe might be associated with the website of Acme Corp. as well as an image of Acme Corp's headquarters building, Acme Corp. signage, and the like. Processing thereafter returns to the calling process (see FIG. 4) at 570.

If no registration currently exists for an image with the specified URL then, at step 580, the process adds a new registration using the gathered image classification data and the provided URL. Using the above example, if a digital image of Acme Corp's president John Doe was input in the registration, then classification labels resulting from the analysis of John Doe's facial image found in the digital image would be associated with the website (URL) of Acme Corp. FIG. 5 processing thereafter returns to the calling routine (see FIG. 4) at 595.

Figure 6:
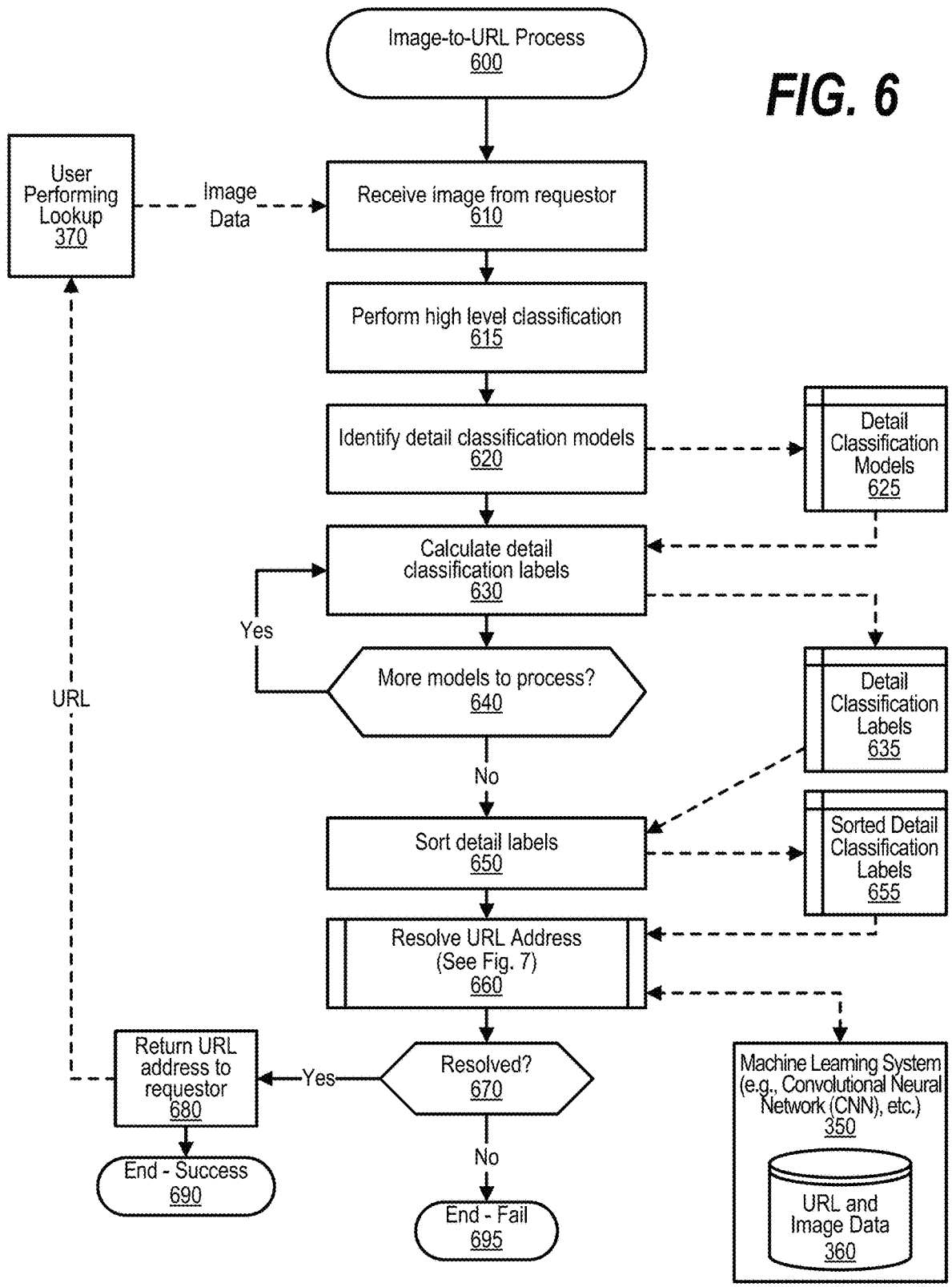
FIG. 6 is a flowchart showing steps performed by a process that converts images to network resource identifiers (URLs)

FIG. 6 is a flowchart showing steps performed by a process that converts images to network resource identifiers (URLs). FIG. 6 processing commences at 600 and shows the steps taken by an Image-to-URL Process. At step 610, the process receives a digital subject matter image (DSMI) from requestor 370. For example, requestor 370 may have captured an image of a person or a building and sent the image to the system in order to obtain a network resource (URL) that pertains to the image. At step 615, the process performs high level classification on the digital image. For example, the high level classification may determine that the received image is a facial image or that the received image is an image of a structure. At step 620, the process identifies detail classification models based upon the high level classification. The identified classification models are stored in memory area 625.

At step 630, the process calculates a set of detailed classification labels pertaining to the first model that was identified at step 620 (e.g., a set of facial classification labels if the detailed classification model is facial images, etc.). The detailed classification labels that correspond to the received digital image are stored in memory area 635. The process determines as to whether there are more detail classification models to process (decision 640). If there are more models to process, then decision 640 branches to the 'yes' branch which loops back to step 630 to calculate additional detail classification labels for the next model. This looping continues until all of the models identified for this image have been processed, at which point decision 640 branches to the 'no' branch exiting the loop.

At step 650, the process sorts the detailed classification labels stored in memory area 635 into an ordered set of detailed classification labels that are stored in memory area 655. At predefined process 660, the process performs the Resolve URL Address routine (see FIG. 7 and corresponding text for processing details). This routine utilizes machine learning system 350 to compare the detailed classification labels identified for the received image to predefined classification labels previously input to the machine learning system and stored in data store 360.

The process determines as to whether predefined process 660 was able to resolve the classification labels identified for the received image to a network resource (URL) at decision 670. If predefined process 660 was able to resolve the classification labels, then decision 670 branches to the 'yes' branch, at which point, at step 680, the URL corresponding to the classification labels identified for the received image are returned to requestor 370, and processing successfully ends at 690. On the other hand, if the classification labels were not resolved to a URL, then decision 670 branches to the 'no' branch whereupon processing ends with a failure at 695. A message indicating that the image did not resolve to a URL might be returned to requestor 370.

Figure 7:
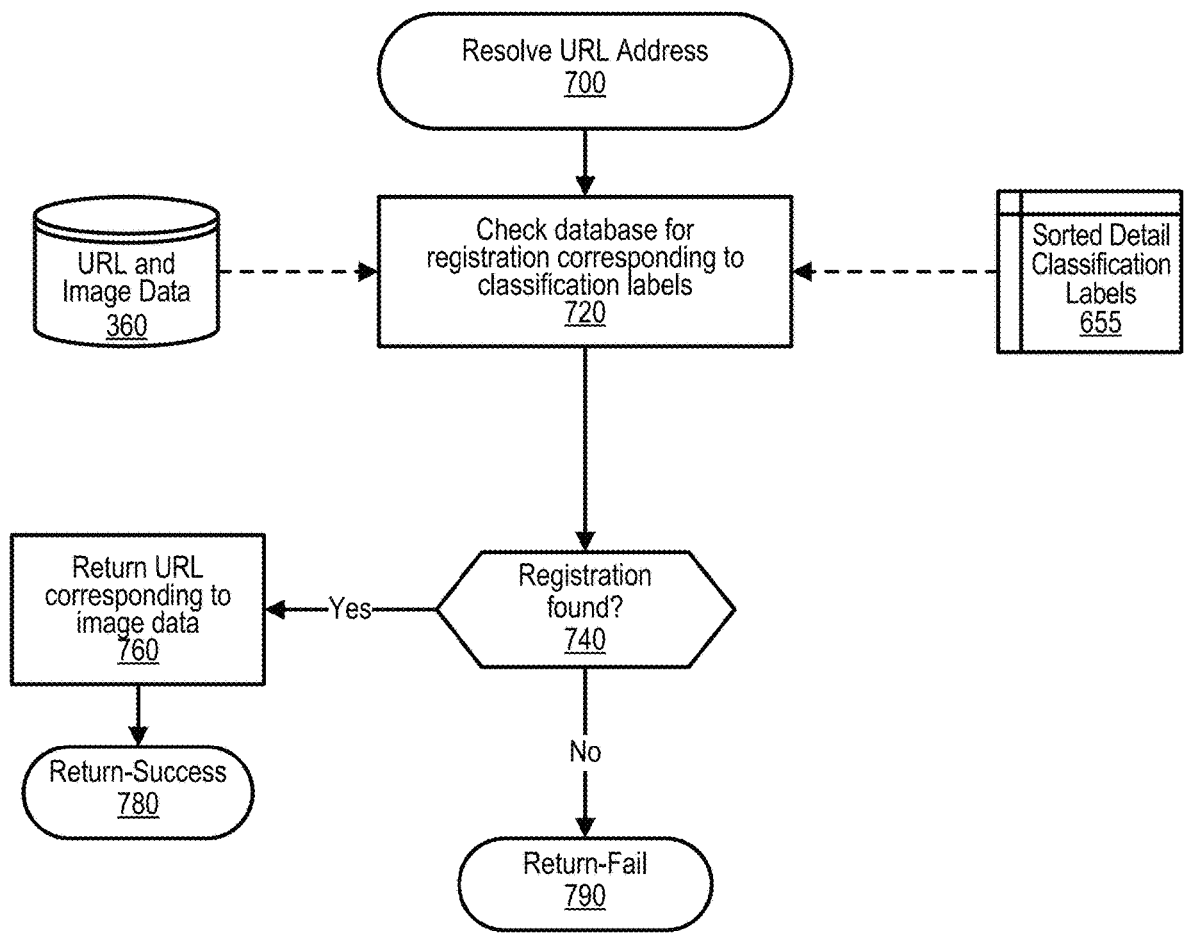
FIG. 7 is a flowchart showing steps performed by a process that resolves network resource (URL) addresses.

FIG. 7 is a flowchart showing steps performed by a process that resolves network resource (URL) addresses. FIG. 7 processing commences at 700 and shows the steps taken by a process that resolves a URL Address from classification data identified for a received digital image. At step 720, the process checks database 360 for a registration that corresponds to the classification labels that were identified for the received image and stored in memory area 655. The database can be a distributed database maintained by a set of name servers.

In the case of a distributed database, the process would query the different name servers using classification label data as query strings. In this implementation, the different name servers would return different parts of the network resource identifier (e.g., one name server returns the first part of a four part URL identifier, another name server returns the second part, etc.).

The process determines as to whether a registration was found in the database (decision 740). If a registration was found, then decision 740 branches to the 'yes' branch, whereupon at step 760, the process returns the network resource identifier (URL) to the requesting process with processing returns to the calling routine (see FIG. 6) at 780. On the other hand, if no registration was found for the identified classification labels, then decision 740 branches to the 'no' branch whereupon processing returns to the calling routine (see FIG. 6) indicating that this routine failed to find a registration for the received digital image.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a processor and memory accessible by the processor, the method comprising:
   registering a plurality of digital images and a corresponding plurality of URLs with a Domain Name System (DNS), wherein the registering further comprises:
      identifying a plurality of predefined labels that correspond to each of the plurality of digital images; and
      associating each of the plurality of URLs with at least one of the plurality of predefined labels;
   receiving a digital subject matter image (DSMI) from a requestor;
   identifying a set of classification labels pertaining to the DSMI;
   matching the set of classification labels to one of the plurality of predefined labels;
   based on the matching, retrieving a selected one of the plurality of URLs associated with the matched predefined label; and
   returning the selected URL to the requestor.

2. The method of claim 1 further comprising:
   performing a high level classification on the DSMI; and
   identifying one or more detail classification models based on the high level classification.

3. The method of claim 2 further comprising:
   calculating a set of detailed classification labels pertaining to each of the detail classification models; and
   ordering the detailed classification labels, wherein the ordered detailed classification labels are used as the set of classification labels.

4. The method of claim 3 wherein the ordering results in a hierarchical set of detailed features extracted from an analysis of the DSMI.

5. The method of claim 1 further comprising:
   matching the set of classification labels to the plurality of predefined labels using a machine learning system, wherein the machine learning system received the plurality of predefined labels by ingesting the plurality of digital images, and wherein the ingesting generated the plurality of predefined labels and associated the plurality of predefined labels to one of the plurality of digital images and to one of the plurality of URLs.

6. The method of claim 1 further comprising:
   resolving the selected URL using a set of one or more query strings that result from the matching to the DNS.

7. An information handling system comprising:
   one or more processors;
   a memory coupled to at least one of the processors;
   a set of computer program instructions stored in the memory and executed by at least one of the processors in order to perform actions of:
   registering a plurality of digital images and a corresponding plurality of URLs with a Domain Name System (DNS), wherein the registering further comprises:
      identifying a plurality of predefined labels that correspond to each of the plurality of digital images; and
      associating each of the plurality of URLs with at least one of the plurality of predefined labels;
   receiving a digital subject matter image (DSMI) from a requestor;
   identifying a set of classification labels pertaining to the DSMI;
   matching the set of classification labels to one of the plurality of predefined labels;
   based on the matching, retrieving a selected one of the plurality of URLs associated with the matched predefined label; and
   returning the selected URL to the requestor.

8. The information handling system of claim 7 wherein the actions further comprise:
   performing a high level classification on the DSMI; and
   identifying one or more detail classification models based on the high level classification.

9. The information handling system of claim 8 wherein the actions further comprise:
   calculating a set of detailed classification labels pertaining to each of the detail classification models; and ordering the detailed classification labels, wherein the ordered detailed classification labels are used as the set of classification labels.

10. The information handling system of claim 9 wherein the ordering results in a hierarchical set of detailed features extracted from an analysis of the DSMI.

11. The information handling system of claim 7 wherein the actions further comprise:
matching the set of classification labels to the plurality of predefined labels using a machine learning system, wherein the machine learning system received the plurality of predefined labels by ingesting the plurality of digital images, and wherein the ingesting generated the plurality of predefined labels and associated the plurality of predefined labels to one of the plurality of digital images and to one of the plurality of URLs.

12. The information handling system of claim 7 wherein the actions further comprise:
resolving the selected URL using a set of one or more query strings that result from the matching to the DNS.

13. A computer program product stored in a computer readable storage medium, comprising computer program code that, when executed by an information handling system, causes the information handling system to perform actions comprising:
registering a plurality of digital images and a corresponding plurality of URLs with a Domain Name System (DNS), wherein the registering further comprises:
identifying a plurality of predefined labels that correspond to each of the plurality of digital images; and
associating each of the plurality of URLs with at least one of the plurality of predefined labels;
receiving a digital subject matter image (DSMI) from a requestor;
identifying a set of classification labels pertaining to the DSMI;
matching the set of classification labels to one of the plurality of predefined labels;
based on the matching, retrieving a selected one of the plurality of URLs associated with the matched predefined label; and
returning the selected URL to the requestor.

14. The computer program product of claim 13 wherein the actions further comprise:
performing a high level classification on the DSMI; and
identifying one or more detail classification models based on the high level classification.

15. The computer program product of claim 14 wherein the actions further comprise:
calculating a set of detailed classification labels pertaining to each of the detail classification models; and
ordering the detailed classification labels, wherein the ordered detailed classification labels are used as the set of classification labels.

16. The computer program product of claim 15 wherein the ordering results in a hierarchical set of detailed features extracted from an analysis of the DSMI.

17. The computer program product of claim 13 wherein the actions further comprise:
matching the set of classification labels to the plurality of predefined labels using a machine learning system, wherein the machine learning system received the plurality of predefined labels by ingesting the plurality of digital images, and wherein the ingesting generated the plurality of predefined labels and associated the plurality of predefined labels to one of the plurality of digital images and to one of the plurality of URLs.

18. The computer program product of claim 13 wherein the actions further comprise:
resolving the selected URL using a set of one or more query strings that result from the matching to the DNS.

19. A method implemented by a domain name server that is an information handling system that includes a processor and memory accessible by the processor, the method comprising:
receiving, over a computer network, a digital subject matter image (DSMI) from a requestor;
analyzing the received DSMI, wherein the analysis results in a plurality of classification labels pertaining to the DSMI;
comparing the plurality of classification labels to a plurality of sets of predefined classification labels, wherein each of the plurality of sets of predefined classification labels corresponds with one of a plurality of uniform resource locators (URLs), the comparing further comprising:
querying a root server and responsively receiving one or more name servers corresponding to subject matter images; and
querying one or more of the received name servers using one or more of the plurality of classification labels and responsively receiving a selected one of the plurality of URLs based on the comparison of the plurality of classification labels to the plurality of sets of predefined classification labels; and
transmitting, over the computer network, the selected URL to the requestor.

20. An information handling system comprising:
one or more processors;
a memory coupled to at least one of the processors;
a set of domain name server computer program instructions stored in the memory and executed by at least one of the processors in order to perform actions of:
receiving, over a computer network, a digital subject matter image (DSMI) from a requestor;
analyzing the received DSMI, wherein the analysis results in a plurality of classification labels pertaining to the DSMI;
comparing the plurality of classification labels to a plurality of sets of predefined classification labels, wherein each of the plurality of sets of predefined classification labels corresponds with one of a plurality of uniform resource locators (URLs), the comparing further comprising:
querying a root server and responsively receiving one or more name servers corresponding to subject matter images; and
querying one or more of the received name servers using one or more of the plurality of classification labels and responsively receiving a selected one of the plurality of URLs based on the comparison of the plurality of classification labels to the plurality of sets of predefined classification labels; and
transmitting, over the computer network, the selected URL to the requestor.

* * * * *